(12) United States Patent  
Karnik

(10) Patent No.: US 8,843,567 B2  
(45) Date of Patent: Sep. 23, 2014

(54) MANAGING ELECTRONIC MESSAGES

(75) Inventor: Neeran Karnik, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 12/627,219

(22) Filed: Nov. 30, 2009

(65) Prior Publication Data

US 2011/0131279 A1 Jun. 2, 2011

(51) Int. Cl.
- G06F 15/16 (2006.01)
- G06F 21/00 (2013.01)
- G06Q 10/10 (2012.01)
- H04L 12/58 (2006.01)

(52) U.S. Cl.
CPC ............ *H04L 12/588* (2013.01); *G06Q 10/107* (2013.01); *H04L 51/32* (2013.01)
USPC ............................................... 709/206; 726/1

(58) Field of Classification Search
CPC ..... G06Q 10/107; H04L 51/32; H04L 12/588
USPC ..................................... 709/209, 206; 726/1
See application file for complete search history.

(56) References Cited

U.S. PATENT DOCUMENTS

| | | | |
|---|---|---|---|
| 6,721,402 B2 | 4/2004 | Usami | |
| 7,010,616 B2 | 3/2006 | Carlson et al. | |
| 7,472,095 B2 | 12/2008 | Huelsbergen et al. | |
| 7,502,831 B1 | 3/2009 | Macias et al. | |
| 7,562,122 B2 | 7/2009 | Oliver et al. | |
| 2004/0162795 A1 | 8/2004 | Dougherty et al. | |
| 2005/0060643 A1* | 3/2005 | Glass et al. | 715/501.1 |
| 2005/0246535 A1* | 11/2005 | Adams et al. | 713/170 |
| 2006/0085504 A1* | 4/2006 | Yang et al. | 709/206 |

(Continued)

FOREIGN PATENT DOCUMENTS

| | | |
|---|---|---|
| EP | 1494409 A2 | 1/2005 |
| WO | 2006088915 A1 | 8/2006 |

OTHER PUBLICATIONS

Lee, Ju Hong; Lee, Jung-Sik; Park, Sang-Ho; Park, Sun; Email Classification Agent Using Category Generation and Dynamic Category Hierarchy; 13th International Conference on AI, Simulation, and Planning in High Autonomy Systems, AIS 2004; LNAI 3397; Oct. 2004; pp. 207-214; Springer-Verlag; Jeju Island, Korea.

(Continued)

*Primary Examiner* — David X Yi
(74) *Attorney, Agent, or Firm* — Dambrosio & Menon, PLLC; Usha Menon

(57) ABSTRACT

Methods, systems, and computer program products for managing electronic messages. A method embodiment for managing electronic messages includes processing message content of an electronic message with an automated content classification module to determine a classification for the electronic message; and applying a security policy to the electronic message in dependence upon the classification. The classification module may be configured for a particular sender. The security policy may be configured for a particular receiver. The system may associate the classification with the electronic message. The system may train the classification module. The electronic message may be an email message, an instant message, a text message, or a message sent in the context of a social networking platform. The security policy may include a display policy or a filtering policy.

24 Claims, 7 Drawing Sheets

(56) References Cited

U.S. PATENT DOCUMENTS

| | | |
|---|---|---|
| 2007/0064899 A1* | 3/2007 | Boss et al. ............... 379/201.01 |
| 2008/0147818 A1 | 6/2008 | Sabo |
| 2008/0162652 A1* | 7/2008 | True et al. .................... 709/206 |
| 2008/0222735 A1 | 9/2008 | Cohen et al. |
| 2009/0089798 A1 | 4/2009 | Anderson et al. |
| 2009/0164588 A1 | 6/2009 | D'Amato et al. |

OTHER PUBLICATIONS

Li, Wenbin; Liu, Jiming; Yao, Yiyu; Zhong, Ning; "An Operable Email Based Intelligent Personal Assistant;" Jun. 2009; pp. 125-147; vol. 12 Issue 2; Kluwer Academic Publishers; Hingham, MA; USA.
International Search Report and Written Opinion of the International Searching Authority for PCT Patent App. No. PCT/EP2010/068091 dated Feb. 10, 2011.

* cited by examiner

MANAGING ELECTRONIC MESSAGES

BACKGROUND

E-mail and other types of electronic messages are often-used tools of the modern workplace. These electronic messages enable job-related communication in a convenient and reliable form. As technology becomes more integrated with day-to-day life, many users utilize electronic messages to communicate outside the workplace as well. As electronic messaging has increased in popularity, new forms of electronic messages have appeared, such as messages in the context of social network platforms.

SUMMARY

Methods, systems, and computer program products for managing electronic messages are disclosed herein. The ease of electronic messaging often leads to continuous spontaneous exchanges of messages. During these spontaneous exchanges, a user may send electronic messages containing sensitive content that is unsuitable for public viewing, such as confidential, secret, or indiscreet content. Preventing the display of this sensitive content may be difficult for the receiver, who may not anticipate receiving it and who may be delayed in realizing the content's display, or who may not be aware of the sensitive nature of the content.

Embodiments of the present disclosure automatically classify the contents of an electronic message. Further embodiments apply a security policy to the electronic message in dependence upon the classification. The delegation functionality described above may be incorporated into existing electronic messaging systems.

In a first general embodiment, the invention includes a method for managing electronic messages including processing message content of an electronic message with an automated content classification module to determine a classification for the electronic message; and applying a security policy to the electronic message in dependence upon the classification. In specific embodiments, the classification module may be configured for a particular sender, and/or the security policy may be configured for a particular receiver. The system may associate the classification with the electronic message. The system may configure the classification module. For example, the system may train the classification module. The electronic message may be an email message, an instant message, a text message, or a message sent in the context of a social networking platform. The security policy may include blocking the transmission or delivery of the electronic message, excising a portion of the electronic message, obscuring a portion of the electronic message, or replacing a portion of the electronic message with an active viewing object representation, which requires the receiver to perform a specific action to view the replaced portion. In a second general embodiment, software modules running on a computer automatically classify the contents of an electronic message. In a third general embodiment, software modules running on a computer apply a security policy to the electronic message in dependence upon the classification. The security policy may include a display policy or a filtering policy.

In a fourth general embodiment, a computer-implemented method for managing electronic messages includes processing message content of an electronic message with an automated content classification module to determine a classification for the electronic message, the automated content classification module configured for a particular sender; associating the classification with the electronic message; and applying a receiver security policy configured for the particular receiver in dependence upon the classification. The method may also include training the automated content classification module with sample data. Processing the message content may occur at a sending client and applying the receiver security policy may occur at a message server. Alternatively, processing the message content may occur at a sending client and applying the receiver security policy may occur at a receiving client. In some implementations, processing the message content may occur at a message server and applying the receiver security policy may occur at a receiving client.

Other general embodiments include a system for electronic messaging comprising one or more data processing systems ('computers'). The data processing systems comprise a processor and a computer memory operatively coupled to the processor. The computer memory of one or more of the systems have disposed within it computer program instructions for execution on the processor to implement one or more of the method embodiments described above.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
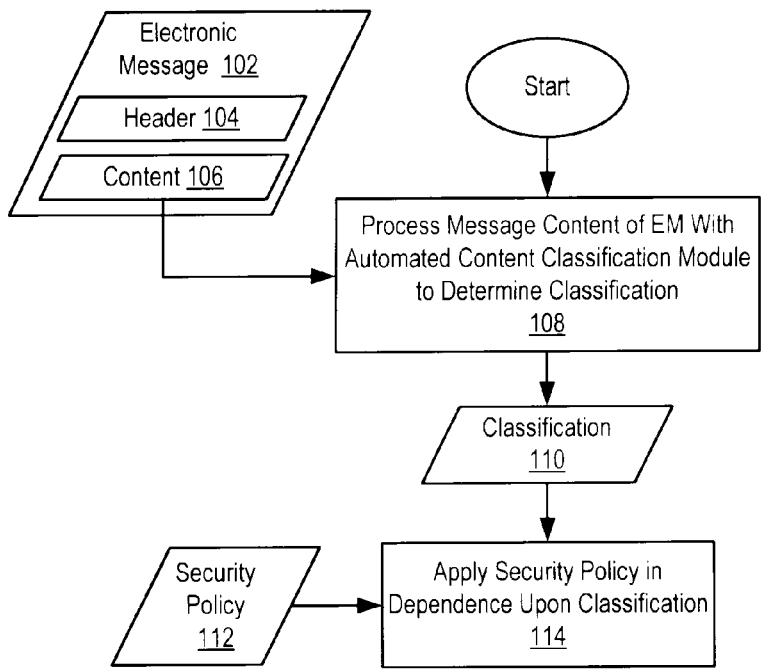
FIG. 1 illustrates a method in accordance with embodiments of the present invention.

Exemplary methods, systems, and design structures for managing electronic messages according to embodiments of the present invention are described with reference to the accompanying drawings. The terminology used herein is for the purpose of describing particular embodiments only and is not intended to be limiting of the invention. As used herein, the singular forms "a", "an", and the are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, components, acts, and equivalents of all means or step plus function elements in the claims below are intended to include any structure, material or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a method in accordance with embodiments of the invention. Referring to FIG. 1, the invention includes a method for managing electronic messages including processing message content 106 of an electronic message 102 with an automated content classification module to determine a classification 110 for the electronic message (block 108); and applying a security policy 112 to the electronic message 102 in dependence upon the classification 110 (block 114).

The electronic message 102 may be an email message ('email'), a textual message implemented through protocols such as the Short Message Service ('SMS') protocol or content implemented through the Multimedia Messaging Service ('MMS') ('text messages'), an instant message sent utilizing one of various instant messaging protocols on one of various messaging platforms (e.g., IBM Lotus Sametime, Yahoo Instant Messenger), a message sent in the context of a social networking platform (e.g. Twitter, MySpace, Facebook, etc.), or any other type of electronic message as will occur to those of ordinary skill in the art. The electronic message 102 may include header information (header 104) and message content 106. Header information may include commonly used header fields containing information such as a designation of intended recipient (i.e., the addressee), a designation of the sender, subject information, formatting information, timestamps, and so on as is well known in the art. Message content 106 comprises the content of the message (e.g., the information being sent), such as text, images, audio files, and so on. For example, in an email, the text in the email body is message content 106. Metadata associated with the electronic message 102 may also be included in message content and processed by the automated content classification module, such as, for example, content-type metadata in an instant message.

Processing message content 106 of an electronic message 102 with an automated content classification module to determine a classification 110 for the electronic message (block 108) may include any of a variety of techniques that have been developed for automated classification of text/documents, images, and the like. The automated content classification module may be configured to select from pre-defined classifications. The automated content classification module can automatically assign one or more of these classifications to the electronic message 102.

The classification 108 may be a classification pertaining to the unsuitability of the content for viewing. For example, the classification may be one of a plurality of pre-defined classifications available to better categorize the level or type of suitability (or unsuitability) of the content. For example, the classifications may include Confidential (e.g., job interviews, salary information, etc.), Secret (e.g. supplier information, customer information), and Indiscreet (e.g., adult content). Alternatively, the classifications might include Low Unsuitability, Medium Unsuitability, and High Unsuitability, or a rating on a numerical scale. The classifications in some implementations may be mutually exclusive. In other implementations, some groupings of classifications may be mutually exclusive, but not other groups, or none of the classifications may be mutually exclusive.

Applying a security policy 112 to the electronic message 102 in dependence upon the classification 110 (block 114) may include performing a lookup of rules in a hash table keyed to the classification, the use of configuration files or rules engines, and so on. The security policy 112 may include a compilation of security rules in a record. The security rules may implement security policy actions to prevent public display of sensitive content (e.g. unsuitable content), such as, for example, by modifying the display of content, or altering delivery of the content. Public display may include any display which may be seen by someone other than the intended recipient, such as for example, a person on an airplane, a colleague working at the same office, a family member, and so on. The security policy 112 may effect a particular presentation rule for a particular classification. For example, applying the security policy 112 may be carried out by excising a portion of the electronic message (e.g., the unsuitable portion), obscuring a portion of the electronic message, blocking the electronic message, or replacing a portion of the electronic message with an active viewing object representation. Any of these display policies may be associated with a particular classification (for example. Confidential) in the security policy 112. The security policy 112 may be carried out via the electronic message client, or otherwise at the receiver. Alternatively, the security policy 112 may be carried out by transmitting an electronic message 102 altered to produce a modified presentation of the content.

Obscuring a portion of the electronic message may be carried out with display techniques such as changing the color of text to a low-contrast color (e.g. pale yellow text on a white background), decreasing font size, changing to a font that is less legible, providing an "overlay" effect such as crosshatching or randomly curved lines, or other optical effects making close inspection necessary for the receiver to determine the content. An active viewing object representation is a substitute for the sensitive portion of the message content during display of the message content that requires the receiver to perform an action to see the sensitive portion of the message content. For example, the active viewing object representation may comprise hyperlinked text, button, or other icon that, when selected, allows viewing of the replaced content. Upon activation of the active viewing object representation, the messaging client 212 may dynamically restore the replaced content. The messaging client 212 may also open a new window containing the content, create a file containing the content, print the content to a specific dedicated printer, and so on.

Figure 2A:
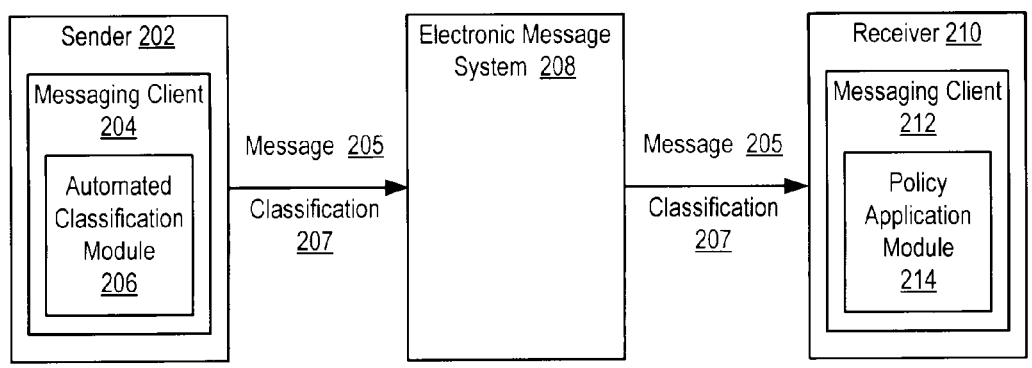
FIGS. 2A-D illustrates a use case in accordance with embodiments of the percent invention.

FIGS. 2A-D illustrate use cases in accordance with embodiments of the invention. Referring to FIG. 2A, a sender 202 carries out an exchange of electronic messages with receiver 210. The sender 202 sends an electronic message 205 having a message component via messaging client 204 and electronic messaging system 208. The messaging client 204 includes an automated content classification module 206. In connection with sending the electronic message 205, the automated content classification module 206 processes the content of the electronic message 205 to determine a classification 207 for the electronic message 205. Messaging client 204 associates classification 207 with the electronic message. For example, the messaging client 204 may include classification 207 with electronic message 205 for transmission to electronic messaging system 208. From message electronic messaging system 208, the message is delivered to a receiver 210 having a messaging client 212. The classification 207 is also delivered to the electronic messaging client 212. Electronic messaging client also includes a policy application module 214. Policy application module 214 applies a security policy 112 to the electronic message 205 in dependence upon the classification 207.

The automated content classification module 206 may be configured for a particular sender, and/or the security policy 112 of policy application module 214 may be configured for a particular receiver. The electronic messaging system 208 may be any electronic messaging system as will occur to those of skill in the art. The classification 207 may be added to the electronic message 205 by attaching the classification 207 or embedding the classification 207 in the electronic message 205 using various mechanisms discussed below. In some embodiments of the invention, the classification 207 may be sent separately from the electronic message 205.

Figure 2B:
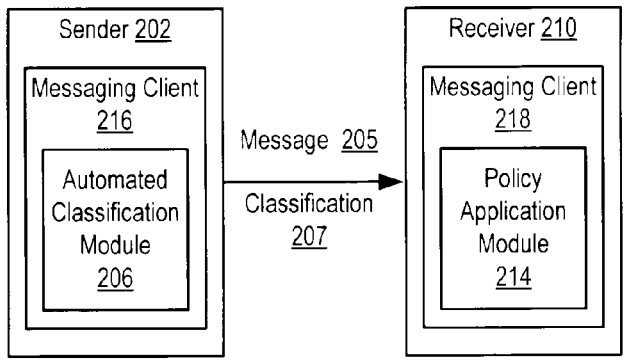

Referring to FIG. 2B, a sender 202 in a peer-to-peer messaging system carries out an exchange of electronic messages with receiver 210. The sender 202 sends an electronic message 205 having a message component from messaging client 216 to a receiver 210 having messaging client 218. The messaging client 216 includes an automated content classification module 206 identical to that of FIG. 2A, and messaging client 218 includes policy application module 214. The messaging client 216 sends the electronic message 205 directly to receiver 210 along with classification 207. Policy application module 214 in messaging client 218 applies a security policy 112 to the electronic message 205 in dependence upon the classification 207.

Figure 2C:
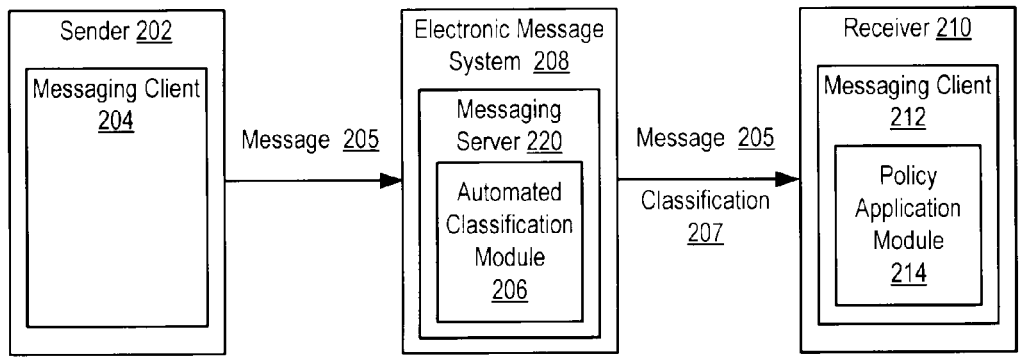

Referring to FIG. 2C, a sender 202 carries out an exchange of electronic messages with receiver 210. The sender 202 sends an electronic message 205 having a message component via messaging client 204 and electronic messaging system 208. The electronic messaging system 208 includes an automated content classification module 206. In connection with receiving the electronic message 205, the automated content classification module 206 processes the content of the electronic message 205 to determine a classification 207 for the electronic message 205. Electronic messaging server 220 in electronic messaging system 208 associates classification 207 with the electronic message. For example, the messaging client 204 may include classification 207 with electronic message 205 for transmission to electronic messaging system 208. From message electronic messaging system 208, the message is delivered to a receiver 210 having a messaging client 212. The classification 207 is also delivered to the electronic messaging client 212. Electronic messaging client 212 includes a policy application module 214. Policy application module 214 applies a security policy 112 to the electronic message 205 in dependence upon the classification 207. Security policy 112 may be configured for receiver 210.

Figure 2D:
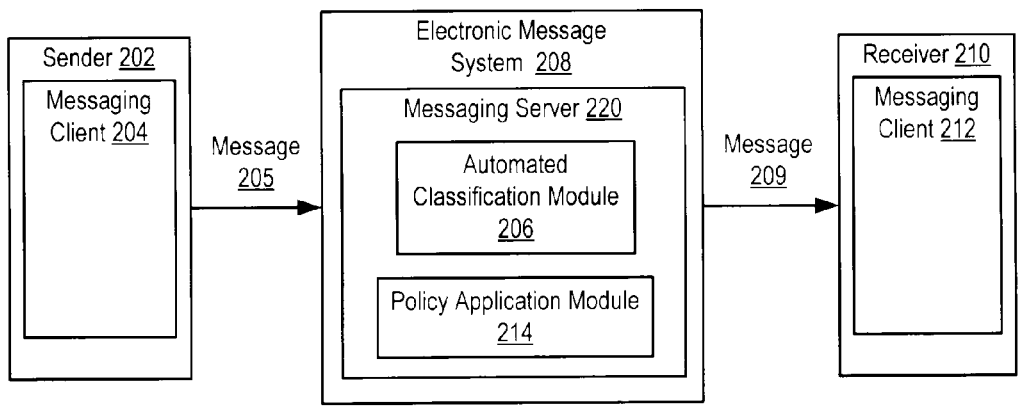

Referring to FIG. 2D, a sender 202 carries out an exchange of electronic messages with receiver 210. The sender 202 sends an electronic message 205 having a message component 203 via messaging client 204 and electronic messaging system 208. The electronic messaging system 208 includes an automated content classification module 206. In connection with receiving the electronic message 205, the automated content classification module 206 processes the content of the electronic message 205 to determine a classification 207 for the electronic message 205. Electronic messaging server 220 further includes a policy application module 214. Policy application module 214 applies a security policy 112 to the electronic message 205 in dependence upon the classification 207. Policy application module 214 may alter electronic message 205 to effect altered presentation of the content at the receiver 210, producing altered electronic message 209. In some implementations, security policy 112 may be a global security policy. Automated content classification module 206 may also be configured globally. Alternatively, automated content classification module 206 or security policy 112 may be configured for a specific sender or receiver, respectively. Electronic messaging server 220 in electronic messaging system 208 delivers the altered electronic message 209 to receiver 210 having a messaging client 212. Messaging client 212 may include special functions or modules (e.g., plug-ins) to detect and render the altered presentation of the content.

The following discussion illustrates the invention through particular embodiments. Discussion of these embodiments may include elaboration in the context of email, instant messaging, or messaging through social networks. However, embodiments of the present invention may be implemented in any form of electronic message as will occur to those of ordinary skill in the art.

E-mail and instant messaging (like other forms of electronic messaging) may be implemented through various system architectures, such as an Internet-based client-server architecture, LAN-based client-server architecture, a web-based email browser-server (Yahoo Mail, Yahoo Messenger, Google Mail, Google Talk, etc.), and integrated collaborative systems (IBM Lotus Notes, IBM Lotus Sametime, Microsoft Exchange, etc.). Electronic message system 208 may include any or all of the components of any of these architectures. Electronic message system 208 may also comprise a web-based social messaging platform (e.g., Twitter, MySpace, Facebook, etc.).

Embodiments of the present disclosure include computer-implemented methods described below. In some embodiments, these methods may be carried out entirely on one apparatus or computer of the system. Alternatively, portions of the methods may be carried out on two or more computers connected by a network or a network device connecting the computers. The order of method elements as described herein does not necessarily limit the order in which the elements can be performed.

Figure 3:
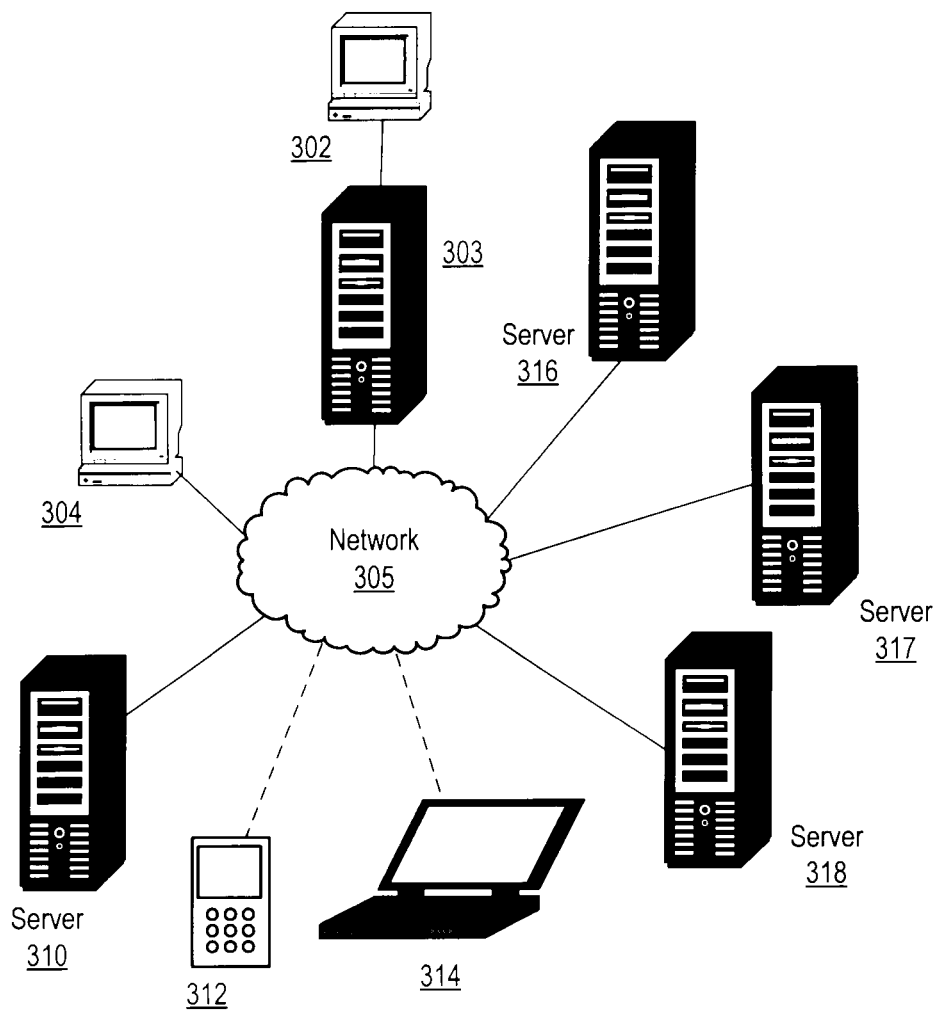
FIG. 3 illustrates a system for managing electronic messages in accordance with one embodiment of the invention.

FIG. 3 illustrates a system for managing electronic messages in accordance with one embodiment of the invention. The system of FIG. 3 includes a computer 304 running an electronic messaging client connected through a network 305 to an electronic messaging server computer 310 running an electronic messaging server application. Computer 304 is a desktop computer. In the case of email, for example, the client running on computer 304 formats the message in e-mail format and uses the Simple Mail Transfer Protocol ('SMTP') to send the message to the local mail transfer agent ('MTA') operating on mail server 310, such as a mail server 310 provided by an Internet Service Provider, or an MTA operating on computer 304. The MIA determines the destination address and, using the Domain Name System ('DNS'), finds mail exchange servers that accept messages for the domain corresponding to the address. The MTA sends the message to the exchange server 316 via SMTP. The exchange server delivers it to the appropriate mailbox. Laptop computer 314 may implement email in a similar manner by connecting wirelessly to the internet. Smart phone 312 may also receive email through carrier-based technologies. Computer 304 may also implement email by using an internet browser to communicate with a web-based email server application running on server 318.

A second desktop computer 302 is locally connected to an integrated collaborative system 303 which manages instant messaging, email, appointment setting, and contact information for all system users. Integrated collaborative system 303 may have an internal instant messaging format and may incorporate a server having proprietary protocols. The server sends or receives instant messages through the product's Internet gateway. Instant messaging between users using the same integrated collaborative system 303 may be implemented entirely within the system.

Smart phone 312 may connect wirelessly to network 305 and establish a session with a social messaging server 317. The smart phone client sends electronic messages in a proprietary format via http requests. The server 317 dynamically posts the content of the message on web pages keyed to an account of the smart phone's user.

Network 305 may include, alone or in combination, one or more local area networks ('LANs'), wide area networks ('WANs'), wired or cellular telephone networks, intranets, or the Internet. Embodiments of the present invention include computer implemented methods operating on any of computer 302, 304, integrated collaborative system 303, servers 310, 316-318, laptop computer 314, or smartphone 312, alone or in combination. Embodiments of the present disclosure may include any or all of the devices depicted in FIG. 3.

The devices disclosed in FIG. 3 are provided for illustration and not for limitation. Embodiments of the invention could be implemented as any viable computing device including logic and memory, or software modules including computer program instructions executed thereon, as will occur to one of ordinary skill in the art, including devices where logic is implemented as field-programmable gate arrays ('FPGAs'), application-specific integrated circuits ('ASICs'), and the like.

Figure 4:
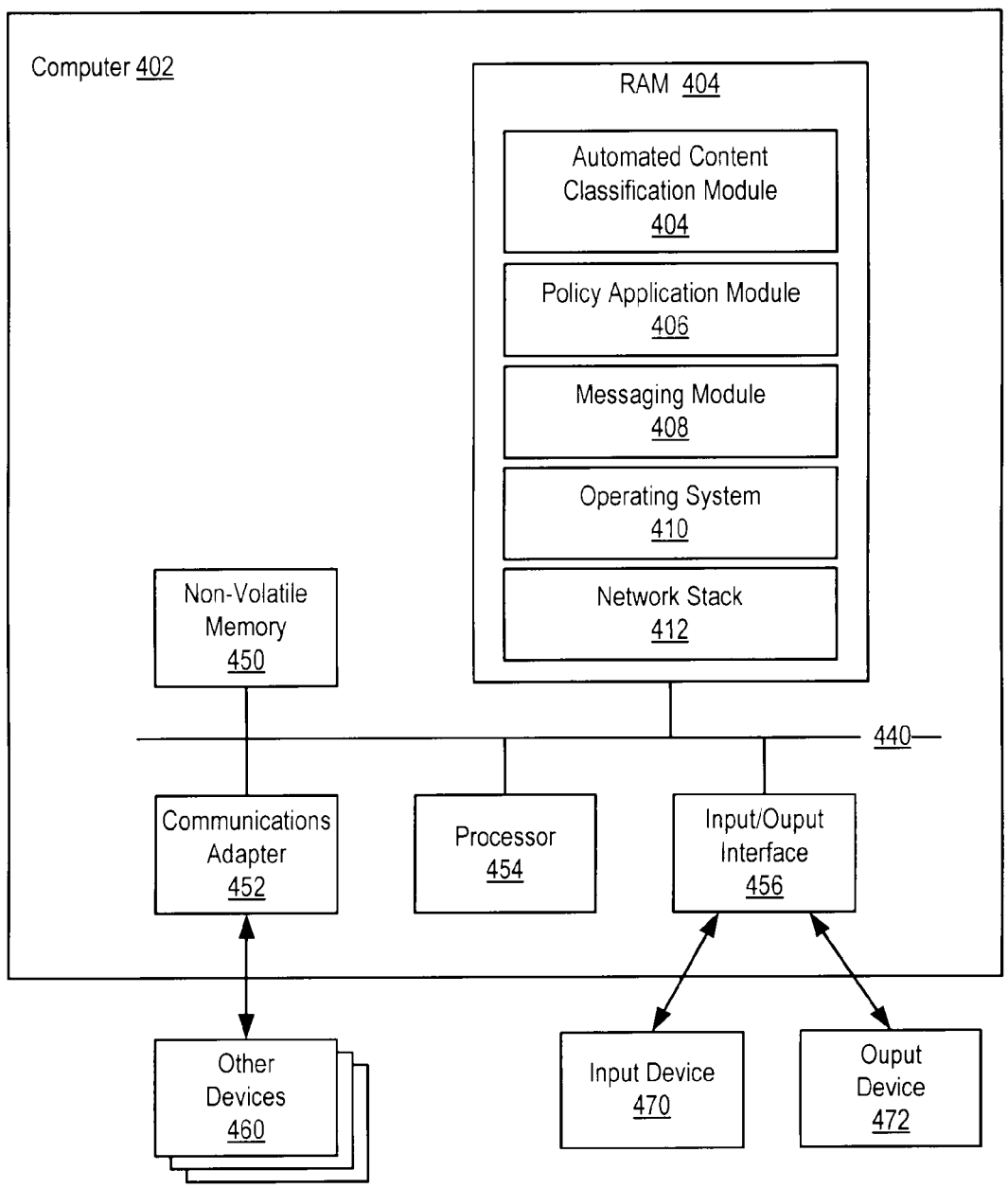
FIG. 4 sets forth a block diagram of a computer used in embodiments of the present disclosure.

Embodiments of the presently disclosed invention are implemented to some extent as software modules installed and running on one or more data processing systems ('computers'), such as servers, workstations, tablet computers, PCs, personal digital assistants ('PDAs'), smart phones, and so on. Each of computer 302, 304, integrated collaborative system 303, servers 310, 316-318, laptop computer 314, or smartphone 312 is typically implemented as a computer. FIG. 4 sets forth a block diagram of an exemplary computer used in embodiments of the present disclosure. Computer 402 includes at least one computer processor 454 as well as a computer memory, including both volatile random access memory ('RAM') 404 and some form or forms of non-volatile computer memory 450 such as a hard disk drive, an optical disk drive, or an electrically erasable programmable read-only memory space (also known as 'EEPROM' or 'Flash' memory). The computer memory is connected through a system bus 440 to the processor 454 and to other system components. Thus, the software modules are program instructions stored in computer memory.

An operating system 410 is stored in computer memory. Operating system 410 may be any appropriate operating system such as Windows XP, Windows Vista, Mac OS X, UNIX, LINUX, or AIX from International Business Machines Corporation (Armonk, N.Y.). A network stack 412 is also stored in memory. The network stack 412 is a software implementation of cooperating computer networking protocols to facilitate network communications.

Computer 402 also includes one or more input/output interface adapters 456. Input/output interface adapters 456 may implement user-oriented input/output through software drivers and computer hardware for controlling output to output devices 472 such as computer display screens, as well as user input from input devices 470, such as keyboards and mice.

Computer 402 also includes a communications adapter 452 for implementing data communications with other devices 460. Communications adapter 452 implements the hardware level of data communications through which one computer sends data communications to another computer through a network.

Also stored in computer memory is a messaging module 408. The messaging module 408 may include device-specific computer program instructions for implementing electronic messaging. Messaging module 408 may be implemented, in part, as a web browser or instant messaging client application running on a desktop or workstation operated by a user. Alternatively, messaging module 408 may be an integrated collaborative system application. Messaging module 408 may also be implemented, in part, as server applications running on a messaging server or an application server running web-based messaging services. The messaging module functionality is different between different devices of FIG. 3, such as computer 302 and server 310. The messaging module 408 on servers operates to provide messaging service to multiple clients or browsers as described above with reference to FIG. 3 (e.g., determining a destination address, using DNS to find mail exchange servers, sending messages to exchange servers, establishing a session with a social messaging server, etc.).

Computer memory may also contain automated content classification module 404, policy application module 406, or both. Automated content classification module 404 comprises computer program instructions for processing message content of an electronic message to determine a classification for the electronic message. Policy application module 406 comprises computer program instructions for displaying the message content according to a message content display policy or otherwise altering the message transmission in dependence upon the classification. Policy application module 406 or automated content classification module 404 may each be implemented as one or more sub-modules operating in separate software layers or in the same layer. Although depicted as a separate module from the messaging module 408 and the operating system 410, policy application module 406 or automated content classification module 404 or one or more of the sub-modules may be incorporated as part of the messaging module 408, the operating system 410, or both. In some implementations, policy application module 406 and automated content classification module 404 may be combined into one module. In various embodiments, either policy application module 406 or automated content classification module 404 may be implemented in the software stack or in firmware.

Figure 5A:
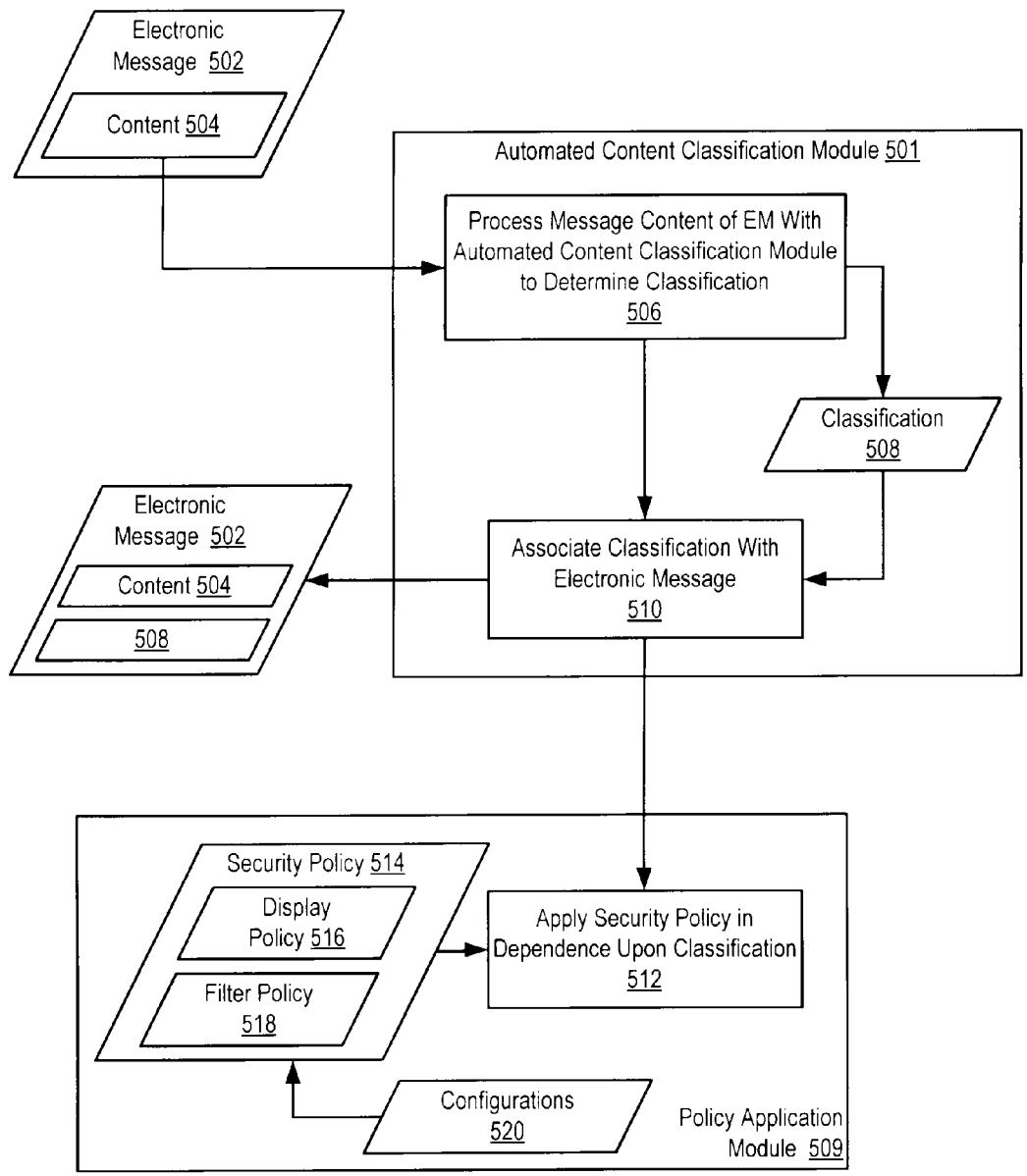
FIGS. 5A and 5B set forth a data flow diagram illustrating a method for managing electronic messages in accordance with embodiments of the invention.

For further explanation. FIG. 5A sets forth a data flow diagram illustrating a method for managing electronic messages in accordance with one embodiment of the invention. Referring to FIG. 5A, an automated content classification module 501 processes message content 504 of an electronic message 502 to determine a classification 508 for the electronic message 502 (block 506).

Processing message content 504 of an electronic message 502 to determine a classification 508 for the electronic message 502 (block 506) may be carried out through the use of an automated content classification module 501 employing a classifier implementing one or more classification techniques.

Processing the content 504 of the electronic message 502 may vary according to the format of the electronic message. The format of Internet e-mail is defined in Request for Comments ('RFC') 2822, which is an updated version of RFC 822. These standards specify the formats of the email such as text email headers and body, as well as rules pertaining to commonly used header fields such as "To:", "Subject:", "From:", and "Date." This standard defines the format for the syntax and headers that make up email messages. A typical email message format consists of specific headers, with no more than one header on a line, followed by a blank line and the message body. An email message following the typical format ends with a period ('.') following a blank line after the message body. The automated content classification module 501 may parse the email to read the text contained in the body of the email.

Consider, for example, the following exemplary email message:
To: user@u.com
From: asmith@.com
Subject: RE: Budget Estimates
My budget will be lower than last year.
Thanks, Avery For the exemplary email above, the automated content classification module 501 may be configured to treat sentences containing the term "budget" as confidential, and thus issues a classification 508 of "<Confidential>."

The automated content classification module 501 associates 510 the classification 508 with the electronic message 502 (block 510). The classification 508 may be implemented as a tag. In some implementations, tags may be inserted in the subject line or the text of the electronic message. In other implementations, email encoding may be altered to imbed tags or identifiers specific to a particular implementation.

In some embodiments, senders may be able to augment or alter the classification. The sender may be provided with a tool embedded in the client interface for choosing specific classifications. In one example, where the classification is added to the subject line, the user may be able to augment the classification by typing in the sender's own tags in the subject line outside of the automated classification process.

For example, Internet email is typically transmitted via SMTP. Because SMTP was initially designed to support only 7-bit ASCII characters, which include only English text characters, SMTP does not transmit other types of files reliably. Multipurpose Internet Mail Extensions ('MIME') format is therefore used to transmit data other than 7-bit ASCII characters as attachments. MIME defines mechanisms for sending other kinds of information in e-mail as attachments, such as, for example, text in languages other than English, text using character encodings other than ASCII, and 8-bit binary content such as files containing images, sounds, movies, and computer programs. An additional mechanism for tagging the email with a classification may be implemented using this technique.

The policy application module 509 applies a receiver security policy 514 configured for a particular receiver 507 in dependence upon the classification 508 (block 512). The security policy 514 includes a message display policy 516 and a message filtering policy 518. The message display policy 516 modifies the display of the content 504. The message filtering policy 518 alters the transmission of messages having sensitive content. For example, the message filtering policy 518 may include actions such as blocking, delaying, or logging messages having sensitive content. Applying the receiver security policy 514 may comprise extracting the classification. For example, the policy application module 509 may extract the classification from the meta-data headers, and apply the policies based on these tags.

A receiver may configure the receiver security policy 514, such as, for example by selecting configurations from a pull down menu, by a particular keystroke combination, by typing commands into a command line interface, by adopting templates available online, by downloading plug-ins, and so on. A user or administrator may configure a security policy for each receiver individually, according to user groups, or any other method of distributed configuration. These configurations 520 may stored as a separate file.

In one example, the user may match classifications with security policy options. The policy application module 509 creates a data structure of the designated classifications and their related policy rules, such as a list, matrix, or table. If the policy application module 509 is remote from the user, such as at a remote server, internet communications protocols (discussed below) may be used to effect the designation. The policy rules may be referred to by object name, by function pointer, by runtime script, or by some other module invocation.

Figures 6A, 6B:
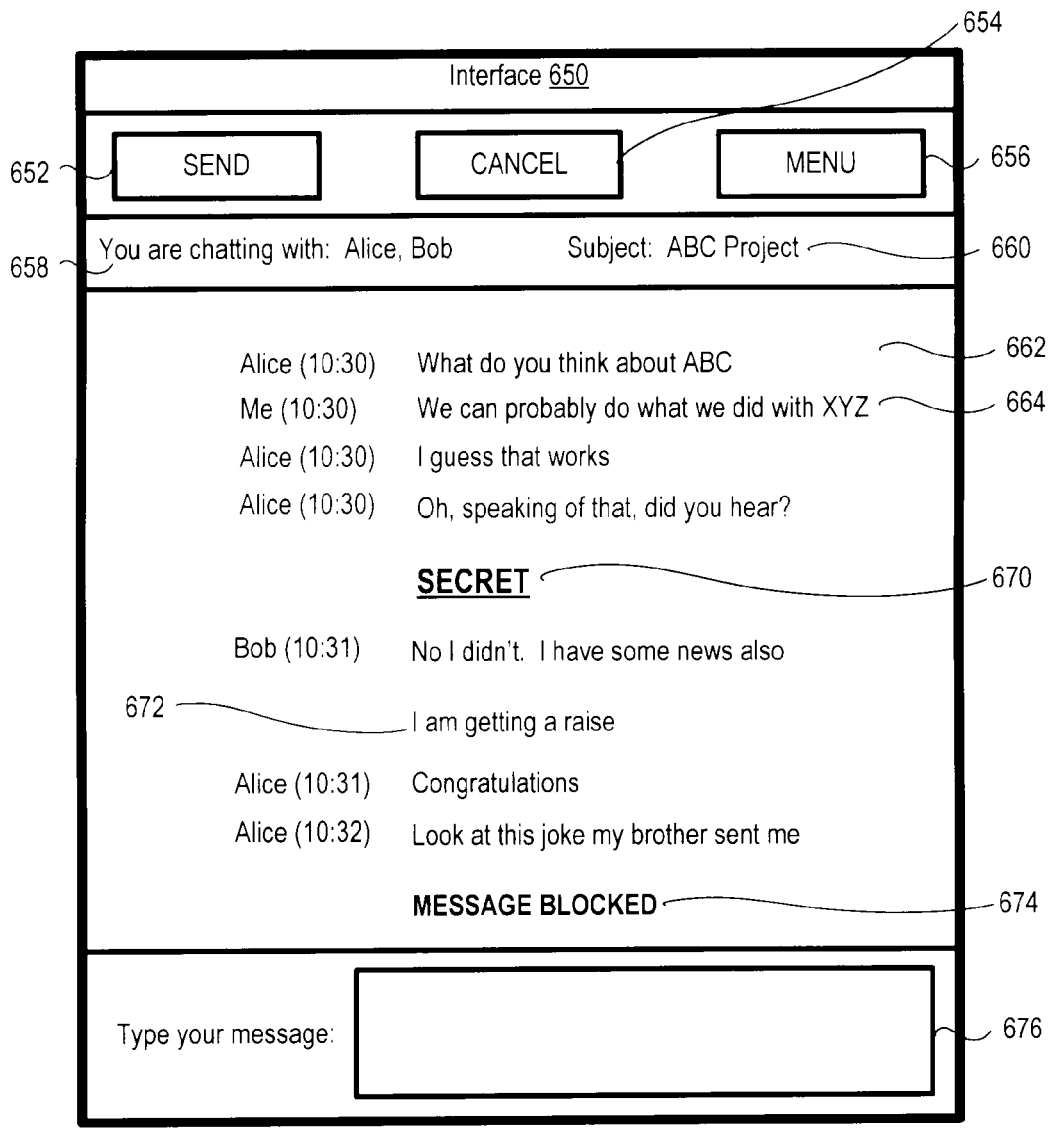
FIG. 6A sets forth an example security policy record in accordance with one embodiment of the invention.
FIG. 6B sets forth a messaging client GUI for managing electronic messages in accordance with one embodiment of the invention.

FIG. 6A illustrates a record containing a security policy in accordance with embodiments of the present invention. The record contains security policy rules comprising classifications 602, 606, 610, 614 paired with security policy actions 604, 608, 612, 616. For example, if an electronic message 502 is tagged with the classification 508 "Adult" 606, the policy application module 509 implementing the security policy 514 blocks transmission of the electronic message 502. If the electronic message 502 is tagged with the classifications 508 "Secret" and "Confidential" 614, the policy application module 509 implementing the security policy 514, invokes actions "Active_Viewing" and "Crosshatch." These actions cause the client to display the electronic message 502 with an active viewing object in place of the message or the sensitive portion of the message. Once the viewer activates the active viewing object, the message is displayed in an obscured manner by covering the text with a crosshatch pattern.

FIG. 6B illustrates an instant messaging graphical user interface (GUI) 650 from a messaging client in accordance with embodiments of the present invention. The interface 650 includes a text box 676 for entry of text of an instant message in a current state of composition. Once text is entered, selecting the "Send" icon 652 initiates classification and transmission of an instant message as described above. "Cancel" icon 654 and "Menu" icon provide standard functionality. Recipient indication 658 illustrates the participants in the chat, i.e., intended recipients of the instant message. A subject field 660 may be used to indicate the subject of the chat. A similar instant messaging graphical user interface (GUI) may be used in connection with web-based instant messaging platforms.

Message box 662 contains recently posted messages. Standard messages 664 are displayed according to usual display paradigms. However, sensitive messages may trigger a modified display. For example, text entered by Alice regarding a merger of XYZ and another party is classified as <Secret>. In response, a security policy module embedded in the messaging client causes the text regarding the merger to be excised and replaced with an active viewing object representation 670 of the excised text. The active viewing object representation 670 includes visually distinct hyperlinked text indicating the classification of the text. Clicking on the hyperlink will result in the display of the text. The text of the active viewing object representation 670 may not be visually distinct or hyperlinked. Specific keystrokes or other GUI manipulations may be required to activate the active viewing object representation 670 in other implementations. The active viewing object representation 670 may also be implemented as a button or other icon. The text may include a warning, an explanation note, or some other type of information instead of the classification.

Message box 662 also contains obscured text 672. Obscured text 672 is displayed in a text color of low contrast to the background color, because it has a classification of <Confidential>. For example, the background may be white, and the text color may be a pale yellow. Alternatively, the background may be black, and the text color may be a dark purple. Message box also contains an indication 674 that a message has been blocked. This message may have been blocked because it contained adult content and is classified as "Adult."

Figure 5B:
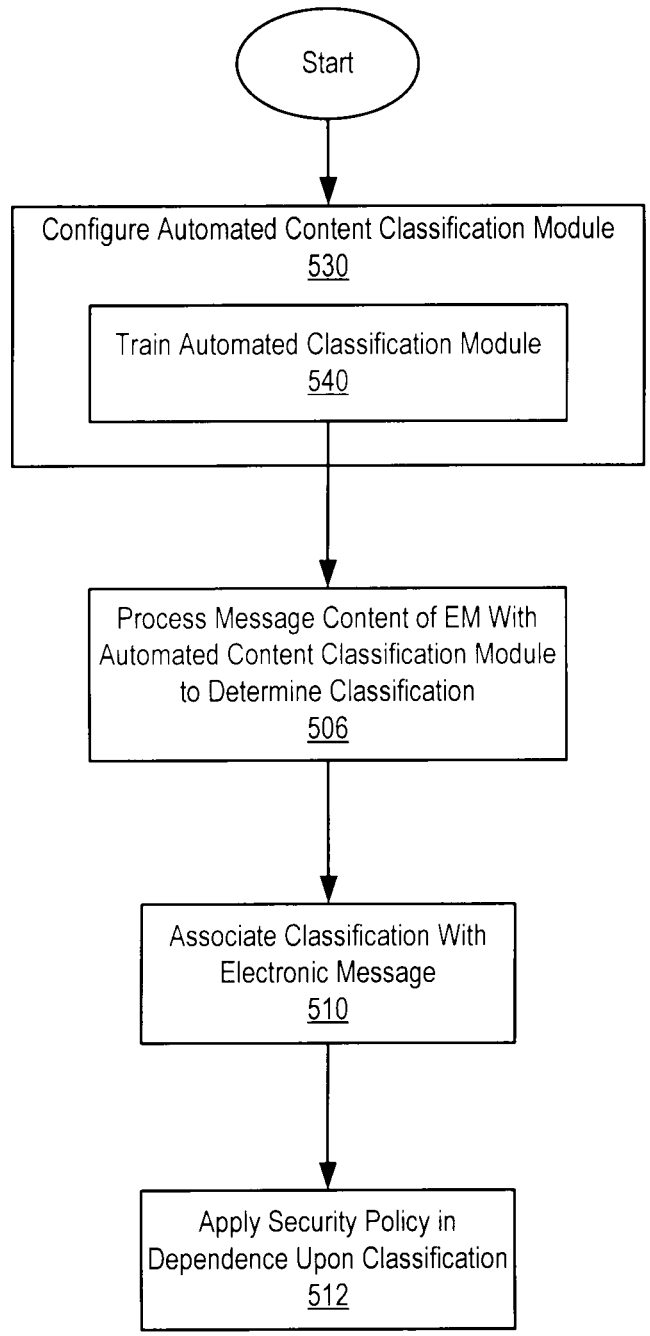

The automated content classification module 501 may be configured for a particular sender. For further explanation, FIG. 5B sets forth a data flow diagram illustrating a method for managing electronic messages in accordance with one embodiment of the invention. Referring to FIG. 5B, system may configure the automated content classification module 501 (block 530).

Configuring the automated content classification module 501 (block 530) may include training the automated content classification module 501 (block 540). Training the automated content classification module 501 (block 540) may be carried out using techniques including machine learning techniques such as, for example, support vector machines ('SVM'), naive Bayesian classifiers, neural nets, k-nearest neighbors techniques, decision trees, or any other technique for automated classification as will occur to those of skill in the art. The classifier may be trained using supervised learning, unsupervised learning, reinforcement learning, or other training techniques. The classifications may be pre-defined, so that automated content classification module 501 may train the classifier to discriminate amongst these classes, using a training set of electronic messages. Thus, given a new electronic message 502, the classifier can automatically assign it one of the pre-defined set of classifications. Configuring the automated content classification module 501 (block 530) may include registering a set of sender preferences in a configurations file. For example, the sender may indicate that confidentiality is of high importance for the sender's messages, which may affect interconnection weights or particular techniques used, for example. Alternatively, a sender or administrator may directly configure weights or techniques in a configurations file.

The method also includes processing message content of an electronic message with an automated content classification module to determine a classification for the electronic message (block 506); associating the classification with the electronic message (510); and applying a receiver security policy configured for the particular receiver in dependence upon the classification (block 512), as described above.

It should be understood that the inventive concepts disclosed herein are capable of many modifications. Such modifications may include combinations of hardware and software embodiments, specific circuit designs, combinations of circuits into an IC, separation of an IC into various components, and so on. To the extent such modifications fall within the scope of the appended claims and their equivalents, they are intended to be covered by this patent.

What is claimed is:

1. A computer-implemented method for managing electronic messages, the method comprising:
processing message content of an electronic message to extract a viewing sensitivity classification for the electronic message, the viewing sensitivity classification being determined by an automated content classification module configured for a sender that created the electronic message and stored on a server associated with the sender;
associating the classification with the electronic message; and
applying a receiver security policy to the electronic message in dependence upon the classification, the receiver security policy being configured for a receiver of the electronic message, the server associated with the sender applying the receiver security policy to the electronic message by performing at least one of the following:
modifying a content of the electronic message displayed to the receiver,
modifying a transmission time of the electronic message to the receiver, and
blocking at least a portion of the electronic message from being transmitted to the receiver,
the classification being formulated at least in part based on one or more preferences specified by the sender, the one or more preferences comprising:
a weighted indication of the importance to the sender of the confidentiality of information included in the electronic message.

2. The method of claim 1 wherein the electronic message is an electronic message selected from the group of electronic messages consisting of an email, a text message, an instant message, or a social networking platform message.

3. The method of claim 1 further comprising training the automated content classification module with sample data.

4. The method of claim 1 wherein processing the message content occurs at a sending client and applying the receiver security policy occurs at a message server.

5. The method of claim 1 wherein processing the message content occurs at a sending client and applying the receiver security policy occurs at a receiving client.

6. The method of claim 1 wherein processing the message content occurs at a message server and applying the receiver security policy occurs at a receiving client.

7. The method of claim 1 wherein the security policy comprises a message display policy.

8. The method of claim 1 wherein the security policy comprises a message filtering policy.

9. A computer program product for managing electronic messages, the computer program product comprising:
a non-transitory computer readable storage medium having computer readable program code embodied therewith, the computer usable program code comprising:
computer readable program code configured to process message content of an electronic message to determine a viewing sensitivity classification for the electronic message, the viewing sensitivity classification being determined by an automated content classification module configured for a sender that created the electronic message and stored on a server associated with the sender;
computer readable program code configured to associate the classification with the electronic message; and
computer readable program code executed by the server associated with the sender and configured to apply a receiver security policy to the electronic message in dependence upon the classification, the receiver security policy being configured for a receiver of the electronic message, application of the receiver security policy comprising at least one of the following:
modifying a content of the electronic message displayed to the receiver,
modifying a transmission time of the electronic message to the receiver, and
blocking at least a portion of the electronic message from being transmitted to the receiver,
the classification being formulated at least in part based on one or more preferences specified by the sender, the one or more preferences comprising:
a weighted indication of the importance to the sender of the confidentiality of information included in the electronic message.

10. The computer program product of claim 9 wherein the electronic message is an electronic message selected from the group of electronic messages consisting of an email, a text message, an instant message, or a social networking platform message.

11. The computer program product of claim 9 further comprising computer readable program code configured to train the automated content classification module with sample data.

12. The computer program product of claim 9 wherein computer readable program code configured to process the message content comprises computer readable program code configured to process the message content at a sending client and computer readable program code configured to apply the receiver security policy comprises computer readable program code configured to apply the receiver security policy at a receiving client.

13. The computer program product of claim 9 wherein computer readable program code configured to process the message content comprises computer readable program code configured to process the message content at a messaging server and computer readable program code configured to apply the receiver security policy comprises computer readable program code configured to apply the receiver security policy at a messaging server.

14. The computer program product of claim 9 wherein the security policy comprises a message display policy.

15. The computer program product of claim 9 wherein the security policy comprises a message filtering policy.

16. A system for managing electronic messages, the system comprising:
a processor; and
a computer memory operatively coupled to the processor, the computer memory having disposed within it:
computer readable program code configured to extract a viewing sensitivity classification associated with an electronic message, the viewing sensitivity classification being determined by an automated content classification module configured for a sender that created the electronic message and stored on a server associated with the sender; and computer readable program code executed by the server associated with the sender and configured to apply a security policy to the electronic message in dependence upon the viewing sensitivity classification, the security policy being configured for a receiver of the electronic message, application of the security policy comprising at least one of the following:

modifying a content of the electronic message displayed to the receiver, modifying a transmission time of the electronic message to the receiver, and blocking at least a portion of the electronic message from being transmitted to the receiver, the classification being formulated at least in part based on one or more preferences specified by the sender, the one or more preferences comprising:

a weighted indication of the importance to the sender of the confidentiality of information included in the electronic message.

17. The system of claim 16 wherein computer readable program code configured to apply a receiver security policy comprises computer readable program code configured to display content of the electronic message according to the security policy.

18. The system of claim 16 wherein computer readable program code configured to apply a receiver security policy comprises computer readable program code configured to alter the electronic message according to the security policy to affect eventual display.

19. The system of claim 16 wherein the security policy comprises a message display policy.

20. The system of claim 17 wherein the security policy comprises a message filtering policy.

21. The method of claim 1 wherein applying a receiver security policy comprises blocking the electronic message.

22. The method of claim 1 wherein applying a receiver security policy comprises excising a portion of the electronic message.

23. The method of claim 1 wherein applying a security policy comprises obscuring a portion of the electronic message.

24. The method of claim 1 wherein applying a security policy comprises replacing a portion of the electronic message with an active viewing object representation.

* * * * *